March 28, 1950     H. D. GIFFEN ET AL     2,502,215
TELEMETRIC RECORDING SYSTEM Filed Aug. 14, 1944     3 Sheets—Sheet 1

INVENTORS.
Harvey D. Giffen
and Thomas B. Thomson Jr.
By: Fred Gerlach atty.

Patented Mar. 28, 1950

2,502,215

UNITED STATES PATENT OFFICE 2,502,215

TELEMETRIC RECORDING SYSTEM

Harvey D. Giffen, Theodore, Ala., and Thomas B. Thomson, Jr., San Diego, Calif., assignors to Consolidated Vultee Aircraft Corporation, San Diego, Calif., a corporation of Delaware Application August 14, 1944, Serial No. 549,440

10 Claims. (Cl. 346—33)

It is the general object of the invention to provide a new and improved telemetric system.

Another object is to provide a telemetric system comprising a transmitter having a plurality of movable elements or gauges, the changes in position or condition of which are to be transmitted and recorded at a remote point, and means for connecting said elements in rapid and recurring sequence or rotation to modulate the signals sent out by said transmitter over a single channel, a receiver having a corresponding plurality of graphic recording devices at the other end of the channel, means for analyzing the incoming signals and utilizing them in similar rapid and recurring sequence to operate the graphic recording devices, and means in the transmitter and said receiver for maintaining synchronism between the respective connecting means of the transmitter and the analyzing means of the receiver.

Another object of the present invention is to provide an improved form of transmitting and recording system wherein gauges located at a remote point are scanned in rapid succession and impulses therefrom transmitted over a single channel and recorded, with the changes effected in each gauge recorded on a separate chart, the scanning being done in such rapid and recurring succession that substantially continuous charts may be produced simultaneously with the changes in the gauges.

Another object of the present invention is to provide an improved form of single channel transmitting and recording system having included therein means for producing a synchronizing frequency for transmission (also on the single channel) to a recording means to synchronize the recording on separate charts of the changes of a plurality of detector gauges used at the transmitting station.

Another object is to provide such a transmitting and recording apparatus for use in the testing of aeroplanes in flight wherein the transmitter is controlled by a large number of independent gauge devices located in various parts of an aeroplane, together with a recording mechanism at a ground station operating in synchronism with the transmitter and having separate chart-producing units, one for each gauge device, so that the changes in the gauge devices are recorded on corresponding charts instantaneously, and in a manner permitting observation at a ground station, of the changes which are occurring in different parts of the aeroplane.

Another object is to provide a flight test apparatus with a new and improved recording apparatus which makes the transmitted data available on the ground simultaneously with the changes occurring in remotely located gauge devices, thereby permitting information as to possible dangers to be transmitted back to the pilot of the plane.

Other objects and advantages will become readily apparent from the following detailed description taken in connection with the accompanying drawings wherein.

The invention, in the exemplary form chosen for purposes of disclosure, comprises a means for transmitting variable frequency signals and for receiving and utilizing these signals to operate a graphic recording means.

Figures 1, 2, 3:
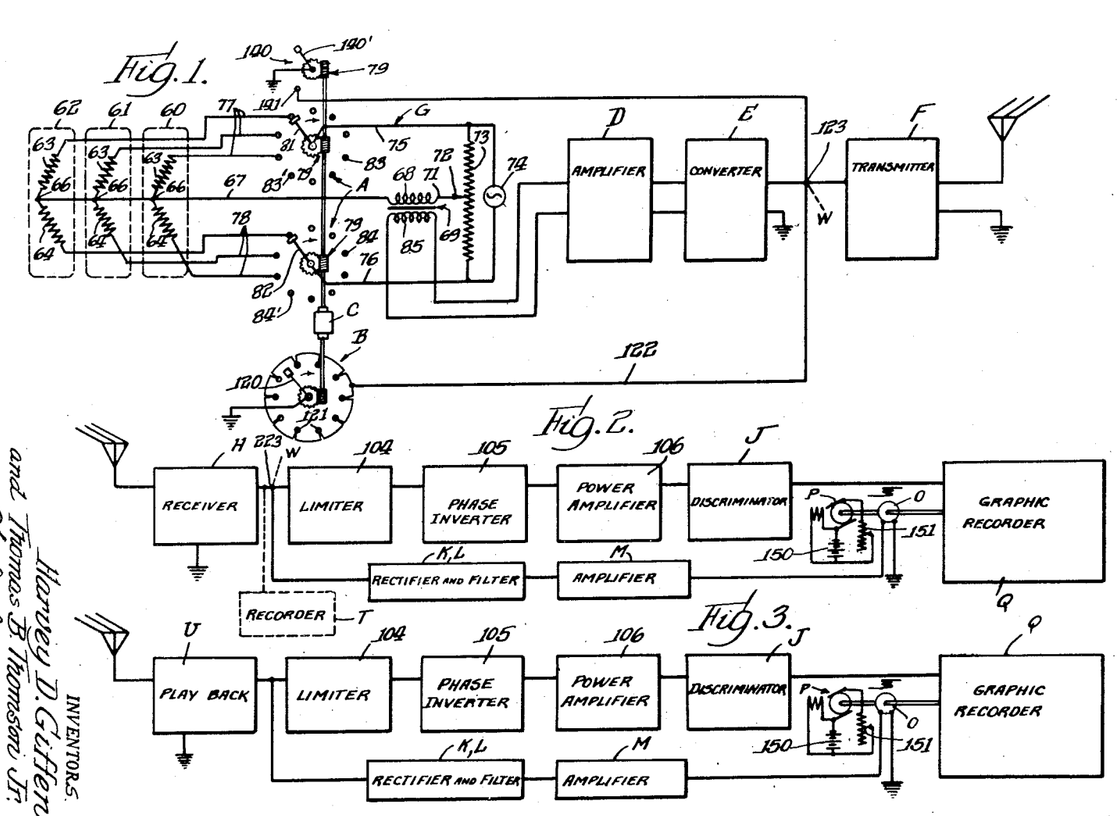
Fig. 1 is a circuit diagram of the transmitting portion of a preferred form of the invention.
Fig. 2 is an elementary circuit diagram of the apparatus at a receiving station.
Fig. 3 is an elementary diagram of a modified form of the apparatus for a receiving station.
Figures 4, 6, 7, 8:
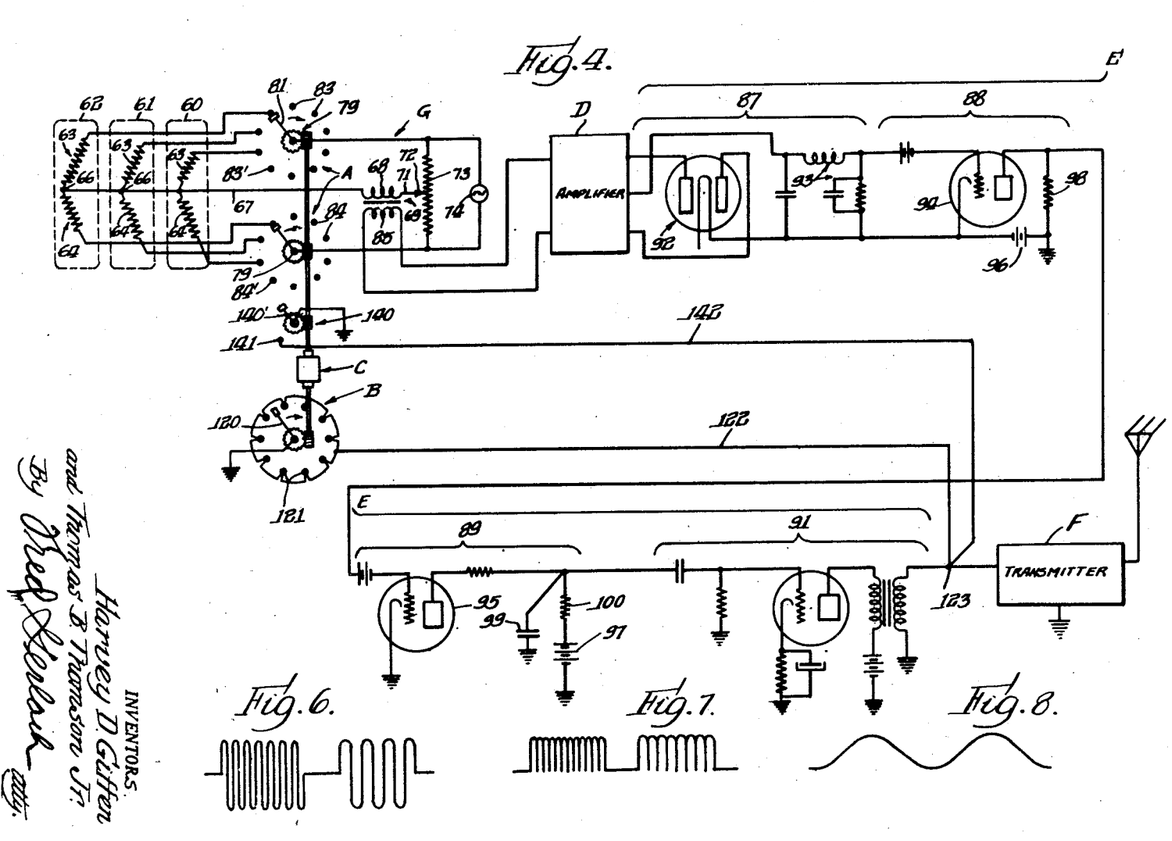
Fig. 4 is a more detailed circuit diagram of the sending station of Fig. 1.
Figs. 6, 7 and 8 illustrate wave forms in different parts of the receiving means.

The transmitting means, as illustrated in Figs. 1 and 4 and in its essentials, embodies a plurality of gauge devices 60, 61, 62, a scanning switch A, an interrupting switch B, a driving motor C, an amplifier D, a converting unit E and a transmitter F. The gauge devices are utilized with the transmitting system and feed signals or impulses thereto. When on an aeroplane, for example, the gauge devices are located at various stations thereon so as to be individually actuated by changes in condition of the parts or accessories with which they are associated. The gauges used are preferably of the type that can be connected into an alternating current Wheatstone bridge G as two arms thereof and changes occurring at the stations where the gauges are located will produce an off balance in the Wheatstone bridge to provide a frequency modulated A. C. bridge carrier which is changed in the converter to a varying frequency which, in turn, is fed into the transmitter to modulate the transmitted carrier wave.

Switch B has the same number of contacts as switch A and has its contacts displaced angularly midway between the contacts of A. Thus, by having the arms of switches A and B rotate in unison, the arm of switch B makes contact in between each contact made by switch A, and operates to produce dead spots between the signals from the gauges for a purpose hereinafter more fully described.

The receiving means comprises a receiver H, a limiter 104, a phase inverter 105, a power amplifier 106, a discriminator J, a rectifier and filter K, L, an amplifier M, a synchronous motor O, a power motor P and an apparatus Q which may be of a recording type. Preferably, the apparatus Q embodies a plurality of actuable elements, one corresponding to and operable in accordance with changes in each gauge device. This apparatus also includes a scanning switch N (Fig. 5) which may be of the same general form as one part of scanning switch A and includes a rotating switch arm and a like number of contacts. The operation of switch N is synchronized with that of switch A so that the signals received at the elements of apparatus Q are in proper correlation with the signals sent out from the various detector gauges.

From Figs. 1 and 2 of the drawings it is apparent that the complete circuit of a preferred form of the invention lends itself to a partitioning into three main divisions; the first division embodies the apparatus and circuit required in transmitting the signals modulated by various detector gauges located at the station being investigated; the second division concerns itself with the reception of the transmitted signals, the re-conversion thereof to variable D. C. voltages, and the transfer of the signals to the circuit of the recording unit; and the third division embodies the recording unit, various electronic circuits associated therewith, synchronizing means, and the other required apparatus.

The detector gauges may be of any conventional type, depending on the information being sought at the station being investigated. These detector gauges preferably comprise a pair of resistance elements which are periodically connected in a circuit to form two arms of a Wheatstone bridge. In Figs. 1 and 4 of the drawings, numerals 60, 61 and 62 represent three gauges (of a group of nine being used) each of which is shown as embodying two resistance arms 63 and 64 which will comprise two arms of the Wheatstone bridge circuit G, and which are joined at a common point 66. The common points of the various gauges are connected together and a lead 67 connects them to one end of the primary 68 of a coupling transformer 69. A second lead 71 joins the opposite end of the primary 68 to a movable contact 72 of a potentiometer 73, the two ends of which form the other two arms of the Wheatstone bridge. An alternating current generator 74 is associated with the potentiometer 73 and is connected across the ends thereof. The gauges are adapted to be connected in rapid succession across the ends of the potentiometer 73 by the leads 75 and 76, and the leads 77 and 78, and the switch mechanism A. The switch mechanism A, as illustrated, comprises a pair of rotating switch arms 81 and 82, the outer ends of which pass over and engage successively two sets of contacts 83 and 84, one set being arranged annularly about the axis of rotation of each of the switch arms. The leads 77 extending from one end of each gauge 60, 61 and 62 are connected to contact set 83 and the leads 78 extending from the opposite end of the gauges are connected to the second set of contacts 84. By rotating the switch arms 81 and 82 in synchronism the gauges are connected individually and in predetermined sequence into the bridge circuit.

The motor C, through suitable gearing 79, effects the rotation of the switch arms 81 and 82 at a constant rate of, for example, about ten revolutions per second, so that each gauge 60, 61, etc., is connected into the bridge circuit in rotation and with predetermined frequency. The invention is not limited to a switch of the type shown or to a mechanical switch, for it is obvious that the switch may assume a variety of forms, either mechanical, electrical or electronic. The number of switch contacts embodied in each of the contact sets 83 and 84 can be varied in accordance with the number of gauges it is desired shall be used. With the switch mechanism A herein shown, nine gauges can be employed; the use of the tenth contact illustrated being explained hereinafter. With a switch mechanism employing eighty contacts a speed of one revolution per second has been found satisfactory.

A coil 85 forms the secondary for the coupling transformer 69 and is adapted to carry the bridge carrier current from the generator 74, as modulated by the successive gauges, to the amplifier D. The amplified signal is then passed through the converter unit E. The circuit representing the converter unit E may be subdivided, as shown in Fig. 4, into the several sections 87, 88, 89 and 91 to segregate the various elements thereof for ease of description. Section 87 includes a conventional rectifier 92, which may be a 6ZY5 rectifier tube, and which rectifies the amplified signals from the Wheatstone bridge G. Associated with the rectifier 92 is a filter 93, of conventional design, and which acts to eliminate ripples that may occur. The direct current signal passed by filter 93 is fed to the portion of the circuit embodying sections 88 and 89. It is here that the various voltages provided by the various gauges are converted into related frequencies. This conversion portion of the circuit comprises two electron tubes 94 and 95; the first tube 94, shown in section 88, is of the 6SK7 type, and the second tube 95, in section 89, is a gas triode tube of the 884 type. Tube 94 acts as a phase reverser and corrects for non-linearity in the tube 95. A battery 96 provides the power for tube 94, and a battery 97 provides the power for tube 95. A resistance 98 associated with tube 94 develops a voltage of the dimension of the voltage of the signal, and this is applied to the grid of tube 95. Tube 95 is an oscillator tube and has associated with it a resistance 100 and a condenser 99 to effect a variable oscillator. Condenser 99 and a resistance 100 will determine the fundamental range of the frequency generated by tube 95, and in the present form of the invention it is assumed to be between 1000 cycles and 4000 cycles. If the range is desired changed, another condenser and resistance should be substituted for condenser 99 and resistance 100 and of appropriate values to obtain the range desired.

The changes in amplitude effected by the various gauges on the D. C. voltage signals fed into the conversion portion of the circuit, will act to cause the oscillator, embodying tube 95, resistance 100 and condenser 99, to change its rate of oscillation. The gauges are so constructed that in their condition of maximum unbalance they will cause the oscillator to change its rate of oscillation to a frequency of 4000 cycles. Thus, as a gauge varies, it produces a frequency which varies between 1000 and 4000 cycles in proportion to the magnitude of the stress or stimuli acting upon the gauge. These variable audio frequency signals are then fed into section 91 which embodies a conventional amplifier. This amplifier will build up the signals to the proper volume required to operate or frequency modulate the transmitter F. The audio frequency signals will be transmitted by the transmitter to the point where readings are to be recorded.

Before the frequencies are fed to the transmitter they will be interrupted periodically by the interrupting switch B (Figs. 1 and 4) which has an arm 120 connected to ground. Contacts 121 of switch B are connected together and are connected by a lead 122 into the circuit at a point 123 beyond the converter E. The interrupter switch B and the scanning switch A are both driven by the motor C and in mechanical synchronization but with appropriate gearing 79 provided so that arm 120 of switch B will engage a contact 121 just as the switch arms 81 and 82 leave contacts and will remain engaged until these switch arms reach the next contacts 83 and 84. In this manner there will be effected a periodic shorting out of the audio frequency signals leaving the converter E by periodically connecting the point 123 of the circuit to ground through lead 122 and switch B.

As noted above, the converter E embodies an oscillator 89 that operates continuously so that the signal at point 123 will be continuous whether the arms 81 and 82 are on contacts 83 and 84 or not, and whether a gauge device is connected in to the bridge circuit or not. A gauge device can only change the pitch or frequency of the oscillations between 1000 and 4000 cycles. Thus every time arm 120 engages a contact 121 there will be a frequency at point 123 that can be shorted out. The signal reaching the transmitter F, as a consequence of the operation of the interrupter switch 113, will assume the form shown in Fig. 6. As shown, this is a continuous signal having abrupt changes of frequency. It is this signal that is sent by the transmitter F.

At the receiving station (Figs. 2 and 5) the receiver H accepts the incoming signals and passes them into the limiter 104, of conventional construction, and which serves to make all the incoming signals of equal amplitude. The signals are then passed through the phase inverter 105, of conventional design, and into a conventional power amplifier 106, which will act to provide more undistorted power. The signals are then passed to the discriminator J wherein the variable frequency signals will be reconverted into proportional D. C. voltages. The discriminator J embodies a bridge rectifier 108 (Fig. 5) comprising two electron tubes 109 of the 6H6 type, two tubes being used because they will produce approximately twice the voltage of a half wave rectifier. A pair of discriminator condensers 111 are associated with the electron tubes 109. Two condensers 111 are used to effect a balance in the rectifier circuit though one may be used if the value of that one were changed proportionately. The variable frequency signals received at the discriminator condensers 111 will have a direct relation to the voltage produced across resistance 112, that is, changes in the reactance of condenser 111 will effect proportional changes of voltage applied across resistance 112. The voltages across resistance 112 will be directly related to the voltage changes produced by the detector gauges 60, 61, etc. A filter 133 of conventional design is provided to eliminate ripples that may occur in the signals.

Thus the changes in amplitude effected by the gauges 60, 61, etc., are converted into proportional frequencies on passage through the conversion unit E and, after transmission over a single channel, are reconverted, in the discriminator J, into voltages, proportional to the transmitted frequencies. These voltages are then passed to the recording apparatus Q, which is described hereinafter but which is more fully described and claimed in an application Serial No. 549,441, filed by us on August 14, 1944, matured into the Patent 2,485,730, issued October 25, 1949.

In the recording apparatus (Fig. 5) the converted signals are carried by a lead 107 to a rotating arm 27 of the scanning switch N. This switch has a plurality of contacts 28 adapted to be successively engaged by arm 27. As the rotating arm 27 engages each of the contacts 28 a potential will be fed into the electronic analyzing or pen actuating circuits 25 which are connected to the contacts. The circuits 25 are referred to as analyzing circuits because they operate in conjunction with other devices to measure the values of the variable voltage signals and to convert them into proportional time intervals. Generally, one contact 28 and associated circuit 25 are provided for each gauge device or signal source, and the switch N is operated in synchronism with a similar switch controlling the connection of the gauge devices in circuit to produce the D. C. potentials. Each of the electronic circuits 25 includes a condenser 29 and a gas filled electron tube 30 such as a 2051 Thyratron. The potential fed to each electronic circuit 25 will charge the condenser 20 therein to a negative potential equivalent to the strength of the signal being fed. This negative potential will act as a bias on the Thyratron tube 30 to prevent the firing thereof.

The means for effecting the firing of the various Thyratron tubes 30 comprises the potentiometer 22 and a power supplying circuit 35 associated therewith. The potentiometer 22 is shown here as having a rotatably supported annular resistance element 33 and ten stationary contact members 31 adapted to move successively from a grounded or dead spot 32 (at the advance end of the resistance 33) and across the resistance element 33. A D. C. source 34 applies a voltage to the resistance of the potentiometer. The voltage supplied by source 34 is of a sufficient value to equal the potential of the maximum D. C. signal potential encountered so that the potentiometer 22 will be capable of passing a potential of sufficient magnitude to counteract the effect of the voltage on condenser 29 in a manner and for a purpose to be described. In the present system the maximum signal voltage is limited to a value of approximately 40 volts. This value is determined by the characteristics of the Thyratron tubes 30 for a potential must be chosen that can be passed without overheating or damaging the tube.

The movement of the movable potentiometer resistance past the contact members 31 of the potentiometer 22 is mechanically synchronized with the movement of the rotating switch arm 27 and each member 31 is associated with a particular electronic circuit 25 leading from contacts 28. The motor P, through suitable gearing and shafting 44', supplies the power for driving the potentiometer resistance across the contact members 31 and for rotating switch arm 27 in step with the signals to be recorded.

To better illustrate the operation of the various parts, one circuit numbered 25a will be traced; this circuit will include the contact 28a in the switch N, contact 31b in potentiometer 22, a condenser 29a, and a Thyratron tube 30a. Thus in circuit 25a with the movement of the switch arm 27 to contact 28a the condenser 29a associated therewith will be charged to a potential equivalent to the potential sent from the impulse source. Movement of arm 27 off of the contact 28a will disassociate the condenser 29a from the impulse source and at this point the contact 31b, acting in the same circuit as condenser 29a, will move from the grounded section 32 of the potentiometer 22 toward the positive end thereof. The gas filled Thyratron tube 30a will pass current only after the grid potential thereof reaches a voltage determined by the characteristics of the tube and which in this instance, for sake of illustration, will be assumed to be a value of —2 volts. In circuit 25a it will also be assumed that there has been impressed upon the condenser 29a, by the signal from the impulse source entering circuit 25a, a potential of —10 volts. When the potentiometer resistance has moved across contact 31b a sufficient distance to produce a voltage of +8 volts on contact 31b the effect of the condenser charge will be neutralized and the Thyratron tube 30a will ignite to pass current for a purpose to be described.

During the period that a charge exists on condenser 29a sufficient to bias the Thyratron 30a against firing, a potential is being built up on a second or pen firing condenser 37a located in the circuit 25a. A battery 38 supplies the D. C. potential impressed upon condenser 37a and as here used has a capacity of 150 volts. However, the potential required here may be supplied from any D. C. source. A pair of resistances 39a and 40a are associated with the condenser 37a and battery 38. Resistance 40a will control the charging rate of the condenser 37a, and resistance 39a acts to pass the charging current of condenser 37a around, or in shunt with, the paper on which charts are laid out. When Thyratron tube 30a fires, it will cause condenser 37a to discharge and pass a current into a pen circuit 3' to cause a mark to be made through pen 41a on a special paper R used with this invention. Therefore, Thyratron tube 30a, in effect, acts as a trigger or relay. The condenser 37a cannot discharge till Thyratron tube 30a fires and completes the discharge circuit of condenser 37a by grounding the upper side of the condenser through the tube, the lower side of the condenser being connected through pen circuit 3', pen 41a and metal roller 42 to ground at 42a. Therefore, the position of the mark made on the paper R with respect to the extremes of each chart will have a direct relation to the potential impressed on condenser 29a from the impulse source; and this position, therefore, will indicate the dimension of the signal being investigated.

Each of the other electronic circuits 25 will operate in a manner similar to circuit 25a just described and each will have elements therein similar to pen firing condenser 37a and resistance 39a and 40a and these elements will be numbered respectively 37, 39 and 40. The battery 38 is common to all of the various condensers 37, supplying the charge to each.

Figure 5:
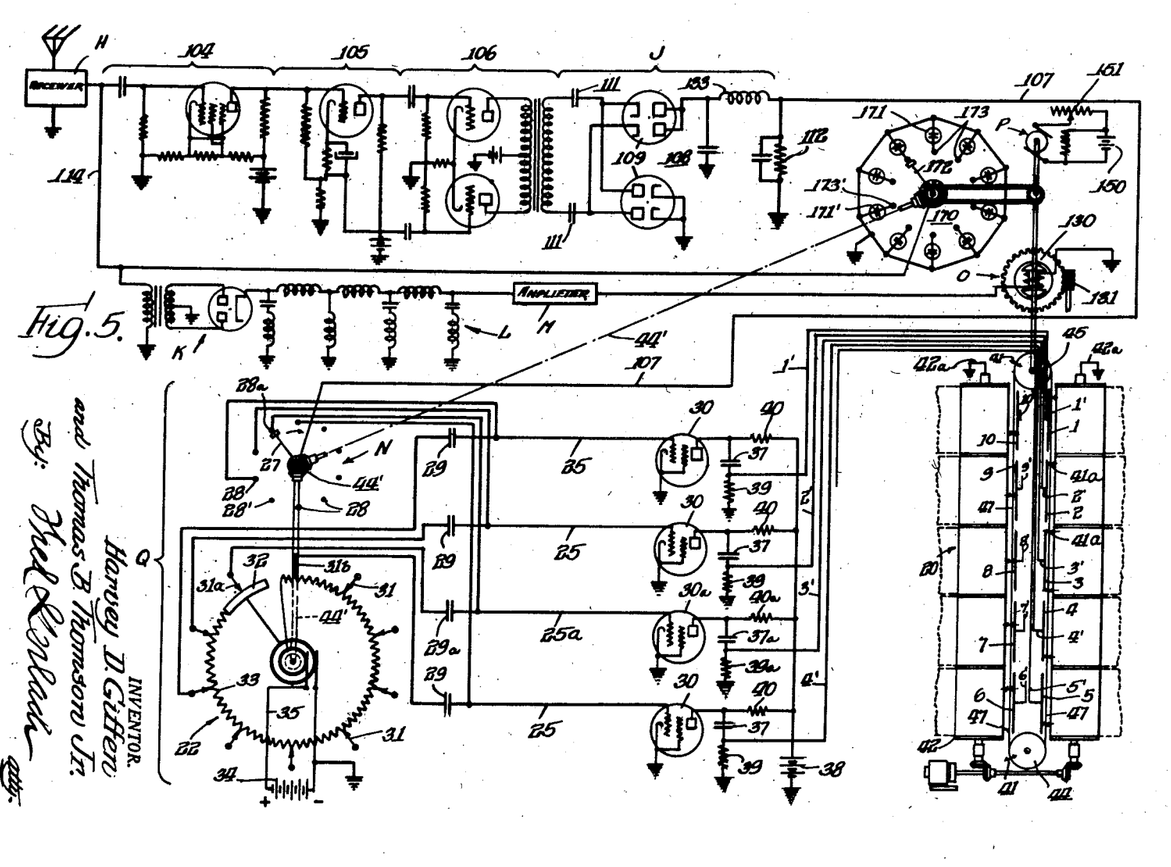
Fig. 5 is a more detailed circuit diagram of the receiving station of Fig. 2.

The printing unit 20, as shown herein in Fig. 5, includes a pair of metallic rollers 42 over which is passed a special type of paper R, known commercially as Teledetos paper, and which reacts to a passage of current therethrough to leave a mark at the point through which current is passed. A plurality of contact strips or trolleys 1 to 10 inclusive, of equal length, are fixed relative to the metallic rollers 42, and each of the trolleys 1 to 10 is connected into its particular electronic circuit 25. Leads 1' through 10' effect the connections between ten electronic circuits 25 and the trolleys 1 to 10. A pen assembly 44 is located between the metallic rollers 42 and comprises two drive sprockets 45 and 46 and an endless belt 47, having thereon thirteen equally spaced pens 41, with ten of the pens being active at one time. The motor P which drives the potentiometer 22 and the switch N also drives the pen assembly 44 through suitable shafting.

It is readily seen that the various pens 41 will not fire simultaneously, but that their moment of firing is dependent on the time that the pen firing condensers 37 discharge and the discharging of the condensers 37 is dependent upon the firing of the Thyratron tubes 30 which act in effect as triggers. The time of firing of the various Thyratron tubes 30 will be, as described, dependent on the potentials impressed on the condensers 29. It is likely that the potentials received from various impulse sources and fed into the various circuits 25 by the switch N will have different magnitudes. The pens 41 will then move along the various trolleys 1 to 10 and no pen 41 will fire until a charge is received from the condenser 37 associated with the particular trolley on which the pens happen to be riding. Thus with ten pens 41 riding on trolleys it is readily seen that each of the pens 41 can fire at different times, dependent on the moment that the Thyratron tube 30 for each circuit fires.

The paper passing over the metallic rollers 42 is divided, as shown, into a plurality of charts of the width of the trolleys. Each of the pens 41 is adapted to act on each of the charts in the course of its movement past each chart, for as one pen 41 accepts the charge from a condenser 37 associated with the trolley on which it is riding to effect a mark on the chart adjacent that trolley, a new impulse from the same source will have been fed into the same circuit by switch N by the time the next pen arrives at this trolley and a new charge will be passed to this pen when the associated contact 31 of the potentiometer has moved a sufficient distance to produce a potential capable of neutralizing the new impulse to thereby permit the associated Thyratron tube 30 to fire again and pass another charge from condenser 37. It is here noted that the movement of the potentiometer across contacts 31 is directly related to the movement of the pens 41, for as a pen 41 arrives at a particular trolley the corresponding contact 31 (associated with that trolley) will move from the grounded portion of the potentiometer in a direction to produce a counteracting voltage on the corresponding tube 30, as described above.

It should be noted that the relationship a pen 41 bears to the trolley on which it is riding at a particular moment will not be the same relationship that the other pens in the system bear to the trolleys on which they are riding. In the ten-chart unit in which the invention has been embodied herein, there will be ten contacts 31 provided in the potentiometer 22, one for each of the electronic circuits 25; and a grounded dead spot 32 will occupy one-tenth of the length of the potentiometer. The potentiometer 22 will be assumed to be operated at such a speed that it will take one second for it to traverse a contact and to return back to any particular point. There being ten contacts 31 embodied in the potentiometer 22, the contacts will leave the grounded end 32 one-tenth of a second apart. Thus if a particular contact 31a has just left the dead spot 32, contact 31b, which follows it, will not leave dead spot 32 until one-tenth of a second later. Because each contact 31 will be traveling nine-tenths of a second on the live portion of the potentiometer 22 the movement of each pen 41 will be such that it will take a pen nine-tenths of a second to travel from one extremity to the other of a trolley. The pens 41 are spaced apart on the belt 47 a distance greater than the length of a trolley. Thus, if the pen on trolley 3 has arrived at the end of its trolley, the pen on trolley 4 will therefore be one-tenth of a second from the end of its trolley, and the next pen, which is on trolley 5, will have to travel two-tenths of a second more upon its trolley, etc. Thus there is one-tenth of a second difference, in the amount of time a pen has ridden on a trolley, between each adjacent pen. This difference in time of travel between each pen is effected to bring the pens into correlation with the disengagement of the successive contacts 31 of the potentiometer 22, from the dead spot 32 thereon. To insure that each of the pens 41 arrives at the zero point or starting end of a trolley just as a contact 31 associated with that trolley engages the live portion of the potentiometer, one-tenth of a second spacing between the contacts 31 is carried over to the spacing of the pens 41. To arrange for the pens to arrive in this manner the trolleys have been spaced apart a distance equal to one-tenth of a second's movement of the belt. During the interval a pen passes from one trolley to the next, the corresponding contact 31 is moving over the dead spot 32 of the potentiometer.

If the invention were to be embodied in a device having a larger number of charts there will be changes in the time factors involved. For example, in an 80 chart device the potentiometer 22 will have 80 contacts 31 and the contacts 31 will follow each other onto the live portion one-eightieth of a second apart and this difference of one-eightieth of a second will be carried to the pens 41 and the trolleys, and each pen 41 will arrive at a trolley one-eightieth of a second later than the pen adjacent to it arrived at its trolley.

It is a feature of this invention that a potential, the duration of which is extremely short, that is, of the order of a few milliseconds, can be noted and an indication made thereof at a determined point for investigation. In the form of the invention herein described it has been shown how the potential received will be stored until the various mechanical elements of the system have had sufficient time to move in their defined paths to analyze and effect an indication of the impulse. It has also been shown that this indication will be directly related to the value of the stored potential.

It is here also noted that though a plurality of detector gauges are being investigated the impulses from these stations will come to the embodiment of the invention over a single channel and in consecutive order, being impressed at conductor 107, from which point the various impulses are fed into various electronic circuits 25 but with all the impulses put out from a particular station being fed into the same electronic circuit.

In the present form of the invention there is provided the additional feature of having the changes of the various gauge detectors plotted on predetermined charts. As switch N rotates to feed the signals received from the various remotely located detector gauges 60, 61 and 62 into the electronic circuits 25, these signals are also fed to a second switch 170 (Fig. 5). However, they are taken off the line immediately after the receiver H by a lead 114 because the signal will be stronger here for the purpose desired than if taken off after they have passed through the discriminator circuit. The switch 170 is driven by the motors O and P, by a gearing connection to the common motor shaft 44', and controls the operation of a plurality of neon tubes 171, there being as many tubes (ten herein) as there are contacts 83 about the switch arm 81 (Fig. 4). Switch 170, being driven by a synchronous motor O, will be in synchronism with switch A at the detecting station and with switch N at the recording station. As the arm 172 of switch 170 successively engages contacts 173 thereof it will pass the received impulses to light the various neon lamps 171. At the sending station (Figs. 1 and 4) a rotating switch 140, having a lead to the ground, is provided with a rotating switch arm 140' adapted to engage a contact 141 each time that the switch A completes a cycle of operation. A lead 142 connects contact 141 into the circuit of Fig. 4 at a point 123 where the variable frequency signal leaves the converter unit 86 so that each time contact 141 is engaged there will be a grounding of the circuit and this will effect a dead spot in the signals transmitted to the receiver H. Therefore, when the transmitted signals are fed to switches N and 170 one contact will be dead in each switch for no power is being fed to it. The neon lamp associated with the dead contact in switch 170 will therefore not light.

Each of the contacts in the recorder switch N will have a related contact in the indicator switch 170, and each of the contacts of switch N is associated with a particular trolley on the recorder, so that the changes from only one detector gauge will be noted on each chart. To have the changes of gauge 60 (for example) plotted on the chart opposite trolley 1 and changes in gauge 61 on the chart opposite trolley 2, etc., the dead spot effected by switch 140 in the transmitted signals is arranged to appear when switch arms 81 and 82 of switch A engage contacts 83' and 84' (Fig. 4). These contacts are chosen as the reference point because the contacts of gauge 60 are the next contacts scanned by arms 81 and 82 and therefore when the dead spot appears at trolley 10 then the signals provided by gauge 60 will appear at the adjacent trolley 1 and will be plotted on its chart. Once the dead spot appears at trolley 10 and the signals of gauge 60 appear at trolley 1, the remaining gauges as they are successively scanned will be plotted on successive charts.

As shown, contact 173' of the neon tube lighting switch 170 is related to contact 28' of the recorder feed-in switch N, and contact 28' controls the signal to trolley 10. Therefore, the dead spot received from the transmitter should appear at contact 173', so that its neon lamp does not light, and therefore there will be no signals to plot on the chart opposite trolley 10.

Assuming, as the investigation begins, that the neon lamp associated with contact 173' lights up, but that another neon lamp does not, the impulses coming through from the various detector gauges will be plotted on a separate chart for each gauge but not on the desired predetermined chart. To have the impulses from the gauges plotted on the charts as desired, it will be necessary to adjust the system. This can be done by slowing the variable speed motor P until it causes the position of the unlighted lamp to move to the neon lamp 171' of contact 173', at which point the motor is brought back up to speed. Thus the dead spot effected when arms 81 and 82 engage contacts 83' and 84' will appear at contact 173' and contact 28', and no charge will pass to trolley 10. The signal of gauge 60 will be picked up by switch arms 81 and 82 immediately after leaving contacts 83' and 84', and this signal will appear at the contacts 173 and contact 28 associated with trolley 1 because the switch arms of switches A, 170 and N are all moving in synchronism and in a clockwise direction.

Rather than by slowing motor P to effect the movement of the position of the unlighted neon lamp, this may be done by rotation of the stator frame 130 of the synchronous motor O, either manually by gearing 131 or by power means (not shown). Rotation of the stator frame 130 will effect a corresponding phase shift of the rotor and thereby effect a shift of the switch arms of switches 170 and N. The dead spot can thus be made to appear at the proper contact.

It should be noted that a means is provided for synchronizing switch N with switch A without the use of interrupter switch B, the synchronous motor O and the rectifier-filter element K. The synchronism can be effected by use of the neon-lamp switch 170 and the variable speed motor P by watching the neon-lamps and adjusting the motor speed so that one particular neon-lamp will always remain unlighted. With this condition obtained (and maintained) the various switches are in synchronism. However, the use of the interrupter switch system with a synchronous motor (as disclosed and claimed in our copending application Serial No. 549,442, filed August 14, 1944 matured into Patent Number 2,466,803, issued April 12, 1949) is preferred, for it will automatically keep the invention in synchronism. This system will now be described.

The frequency signal as received by receiver H is of the form shown in Fig. 6 and is sent from the receiver H into two channels (Fig. 5), one channel leading through the discriminator J and the switch N to the apparatus Q, and the other channel leading through the units K, L and M to the synchronous motor O.

For synchronizing purposes the frequency signal of the form shown in Fig. 6 is first passed through the rectifier K and the signal assumes the form shown in Fig. 7. It is then passed through the tuned filter L and emerges in the form shown in Fig. 8. The frequency of the signal shown in Fig. 8 is dependent upon the number of interruptions effected by the interrupting switch B. If there were 10 contacts embodied in switches A and B and the switch arms are revolved at such a speed as to touch all of these contacts once each second, and the arm of switch B is driven at the same speed as the arm of switch A, switch B will make a contact each time that the switch arm of switch A leaves one contact to move to the adjacent contact and thus switch B will act to interrupt the frequency signals being sent out of the converter 10 times each second. The units K and L convert this interrupted signal and effect a new signal of the frequency of the interruptions. The units K and L are not concerned with the value of the frequency signals received but take the interrupted signals and utilize the envelopes thereof to produce the alternating current shown in Fig. 8. This A. C., after amplification, is then fed to the synchronous motor O to thereby effect the synchronization of switch N with switch A.

To furnish some of the power for driving the switch N the motor P may be connected in tandem with the synchronous motor O, as illustrated in the drawings. Preferably, the motor P is of a variable speed type, the one herein illustrated being arranged to be operated on a direct current source of power indicated by battery 150 in a circuit embodying a rheostat 151. In this way the speed of the motor P can be adjusted so that it carries the desired portion of the load of driving the switch N, the synchronous motor O then serving principally as a means for controlling the speed of operation of the switch N and keeping it in step with the switch A. The invention, it is pointed out, is not to be limited to the employment of a switch N having a rotating arm but may employ a switch of any construction which will operate to perform the desired function.

Although the preferred form of the invention as illustrated in Figs. 1, 2, 4 and 5 is adapted to transmit and record gauge changes substantially instantaneously as they occur, the invention also contemplates that the incoming signals at the receiving station may be recorded for future analysis and use. A disk or a film type recorder T, as shown in dashed lines in Fig. 2, may be connected to receive the signals from the receiver H. In Fig. 3 there is illustrated a modified circuit including a play-back mechanism U for the record produced by T. This record will contain all of the incoming signals, including the synchronizing signals, so that the output from the play-back can be connected into the circuit of Fig. 3, which includes all of the elements of Fig. 2 with the exception of the receiver. In this way the record may be played again and again when such replaying is desirable for purposes of checking critical changes in any one or more of the gauges.

The invention is particularly useful where it is necessary or desirable to produce charts indicating changes in gauge devices substantially simultaneously with the occurrence of such changes. For example, in connection with the test flight of an aeroplane, as many as eighty or more gauges have been used with an apparatus including a switch mechanism A operating at approximately one revolution per second, so that each gauge would be connected in circuit approximately one one-hundredth of a second at a time. A recording apparatus for such an installation included eight 10 chart mechanisms of the type illustrated in Fig. 5 and so arranged that the pens were displaced approximately one-eightieth of a second apart. With such an apparatus it is possible to have observers at the graphic recorder checking the changes which occur in the devices immediately as they occur, and in the event any of the gauges indicate critical changes, the pilot can be warned by radio of the danger.

Although the invention is particularly adapted for the testing of aeroplanes while in flight, it will be obvious to those skilled in the art that it will have many other uses, and that the number of gauge devices embodied in any particular apparatus may be varied within wide limits.

In our use of the word "telemetering" it is to be understood that our invention is not to be limited to systems utilizing a transmitter and receiver but that the invention also can be applied to systems wherein there is a direct wire connection between the source of intelligence and the recording means as shown by the wire W in dashed lines in Figs. 1 and 2 for connecting the junction 123 to the point 223.

It is thought that the invention and its numerous attendant advantages will be fully understood from the foregoing description; and it is obvious that numerous changes may be made in the form, construction and arrangement of the several parts without departing from the spirit or scope of the invention, or sacrificing its attendant advantages, the form herein disclosed being a preferred embodiment for the purpose of demonstrating the invention; and we do not claim herein either the patentable combinations including specific means for controlling the production of high frequency oscillations in the transmitting system or of the transmitting system itself, the same being claimed in a co-pending application Serial No. 535,481, now Patent No. 2,484,218, issued October 11, 1949; nor the combination including particular features of the recording apparatus and the operation thereof, the same being claimed in a co-pending application Serial No. 549,441; nor the combination forming a telemetric system including a plurality of sending stations and the means of operating the same, as claimed in a co-pending application Serial No. 549,442; nor the combination embodying specific means for accomplishing the frequency variation of signal impulses in repeated succession and the manner of so operating a telemetric system, as claimed in a co-pending application Serial No. 549,443, now Patent No. 2,466,804, issued April 12, 1949; the present invention herein claimed residing in the combinations recited in the appended claims.

We claim as our invention:

1. In a telemetric system in which current impulses are transmitted in rotational sequence over a telemetric channel, each impulse having a frequency determined in accordance with the position of an element to be remotely recorded, in combination, converter means for converting said current impulses into proportional D. C. voltages, a plurality of electrical circuits, each including operating means operable after a time delay proportional to the magnitude of D. C. voltage applied thereto, connection means for successively connecting said electrical circuits to said converter means in synchronism with the rotational sequence of the current impulses transmitted over said telemetric channel, and a plurality of recording devices associated with said electrical circuits and operable thereby to indicate D. C. voltage magnitudes, and means to drive said recording devices in synchronism with said connection means whereby the time of operation of said recording devices, by said electrical circuits, after connection of the same is proportional to the magnitude of said D. C. voltages.

2. In a telemetric system in which current impulses are transmitted in rotational sequence over a telemetric channel, each impulse having a frequency determined in accordance with the position of an element to be remotely recorded, in combination, converter means for converting said current impulses into proportional D. C. voltages, a plurality of electrical circuits, connecting means for successively connecting said electrical circuits to said converter means in synchronism with the rotational sequence of the current impulses transmitted over said telemetric channel, a synchronous motor drivingly connected with said connecting means, and means for producing an alternating current, in step with the transmitted impulses, and feeding said alternating current to said motor, and a plurality of recording devices associated with said electrical circuits, said devices each comprising marking means, driving means for moving the marking means with respect to a record sheet in synchronism with the movement of said connecting means, and time delay actuating means, operable by said circuits after a time delay following connection of the circuits with the converter proportional to the magnitude of applied D. C. voltage, for actuating said marking means whereby the time of operation of said recording devices, by said electrical circuits, after connection thereof, is proportional to the magnitude of said D. C. voltages.

3. In a telemetric system in which current impulses are transmitted in rotational sequence over a telemetric channel, each impulse having a frequency determined in accordance with the position of an element to be remotely recorded, in combination, converter means for converting said current impulses into proportional D. C. voltages, a plurality of electrical circuits, each comprising means for temporarily storing a said D. C. voltage, an electron tube biased to inactive condition by such stored D. C. voltage, and power supply means operable in timed relation with said rotational sequence to neutralize said stored D. C. voltage and thus activate said tube, the time of operation of said power supply means in neutralizing said stored D. C. voltage being dependent upon the magnitude of such stored voltage, connecting means for successively connecting said electrical circuits to said converter means in synchronism with the rotational sequence of the current impulses transmitted over said telemetric channel, and a plurality of recording devices associated with said electrical circuits, said devices each comprising marking means, driving means for moving the marking means with respect to a record sheet in synchronism with the movement of said connecting means, each of said circuits being operatively associated with a corresponding marking means to operate the same upon the activation of its associated electron tube, whereby to indicate D. C. voltage magnitudes, the time of operation of said recording devices, by said electrical circuits, after connection of the same, being dependent upon the magnitude of said D. C. voltages applied to bias said tubes.

4. In a telemetric system in which current impulses are transmitted in rotational sequence over a telemetric channel, each impulse having a frequency determined in accordance with the position of an element to be remotely recorded, in combination, converter means for converting said current impulses into proportional D. C. voltages, a plurality of electrical circuits, each comprising means for temporarily storing a said D. C. voltage, an electron tube biased to inactive condition by such stored D. C. voltage, and power supply means operable in timed relation with said rotational sequence to neutralize said stored D. C. voltage, the time of operation of said power supply means in neutralizing said stored D. C. voltage being dependent upon the magnitude of such stored voltage, connecting means for successively connecting said electrical circuits to said converter means, in like rotational sequence, a synchronous motor drivingly connected with said connecting means, and means for producing an alternating current, in step with the transmitted impulses, and feeding said alternating current to said motor, and a plurality of recording devices associated with said electrical circuits and operable by and upon the ionization of said electron tube, and means to move said recording devices in synchronism with said connecting means whereby to indicate D. C. voltage magnitudes, the time of operation of said recording devices, by said electrical circuits, after connection of the same, being dependent upon the magnitude of said D. C. voltages applied to bias said tubes.

5. In a telemetric system having means for transmitting, in rotational sequence, changes in a plurality of gauge devices, by means of variable frequency signals over a single telemetric channel, in combination, means for converting said signals into proportional D. C. voltages, a plurality of electrical circuits, one for each chart, each circuit embodying a chargeable condenser and an electron tube controlled by said condenser, switch means operated in synchronism with the rotational sequence of said signals to deliver the same in rotation to said circuits for charging the condensers thereof in accordance with the intensity of the converted D. C. voltage delivered thereto, a power supply circuit including a potentiometer resistance, and means for producing a current therein, a plurality of potentiometer contacts, one for each electrical circuit and connected to said chargeable condensers, means for causing relative rotary movement of the potentiometer with respect to said contacts, whereby to change the voltage on the associated condensers until the connected electron tubes operate after intervals determined by the magnitudes of the signal voltages fed to said condensers by said switch means, means for supporting and advancing a plurality of charts, chart marking devices mounted to move continuously in one direction across charts carried on said supporting means, and means for moving said chart marking devices, including a motor operated in synchronism with the rotational sequence of said signals, said chart marking devices being each operatively connected with a corresponding electron tube circuit and operable thereby to mark the corresponding chart upon the operation of the associated electron tube.

6. In a telemetric system in which current impulses are transmitted in rotational sequence over a telemetric channel, each impulse having a frequency determined in accordance with the position of an element to be remotely recorded, the combination of converter means for converting said current impulses into proportional D. C. voltage signals, a plurality of continuosly driven recording devices, a plurality of electrical circuits associated with said recording devices for actuating the same, time delay trigger means operatively associated with each said circuits for activating the same for the operation of said recording devices, means for successively connecting said electrical circuits with said converter means in rotational sequence for the actuation of said trigger means each after an interval, following connection thereof with said converter device, proportional to the value of the D. C. voltage signal applied thereto, and means for driving said recording devices in synchronism with said converter means whereby said devices may indicate the magnitudes of said D. C. voltage signals.

7. In a telemetric system having means for producing a carrier wave and for frequency modulating said wave successively at unlike modulating frequencies, to provide variable frequency signals, the combination of a receiver for said variable frequency signals, means for converting the variable frequency signals to proportional D. C. voltage signals, a plurality of record sheet marking devices, a plurality of operating means for effecting the operation of said marking devices to indicate D. C. voltage magnitudes, said operating means each including a time delay element, the delayed operation of which is a proportional function of the magnitude of the D. C. voltage signal applied thereto, whereby to determine the time of operation of the connected marking device, and means for successively connecting said plurality of operating means to said converting means to receive the D. C. voltage signals substantially simultaneously with changes in said variable frequency signals, whereby to operate said plurality of operating means to actuate said record sheet marking devices, the time of operation of said marking devices, by said plurality of operating means, after the connection of said plurality of operating means to receive the D. C. voltage signals thereon, being dependent upon the value of the magnitudes of said D. C. voltage signals applied thereon.

8. In a telemetric system having a plurality of gauge devices, means for transmitting in rapid and repeated rotation signals varying in accordance with the conditions of said gauge devices and means for producing a synchronizing signal for one gauge device location, the combination of a plurality of recording devices, means operable in like rapid and repeated sequence to direct said synchronizing signal and said varying signals to said recording devices so that each recording device, when acted upon by a varying signal, produces a record of a particular gauge device, an indicating device operable in response to a varying signal for each recording device and means for utilizing said synchronizing signal and said varying signals in like rapid and repeated rotation for actuating all of said indicating devices but the one to which said synchronizing signal is directed to show the phase relationship of said signal utilizing means with respect to the rotational sequence of the transmitted signals.

9. In a telemetric system having a plurality of gauge devices, means for transmitting in rapid and repeated rotation signals varying in accordance with the conditions of said gauge devices and means for producing a synchronizing signal for one gauge device location, the combination of a plurality of recording devices, means operable in like rapid and repeated sequence to direct said synchronizing signal and said varying signals to said recording devices so that each recording device, when acted upon by a varying signal, produces a record of a particular gauge device, an indicating device operable in response to a varying signal for each recording device and means for utilizing said synchronizing signal and said varying signals in like rapid and repeated rotation for actuating all of said indicating devices but the one to which said synchronizing signal is directed, and means for adjusting the phase relationship of said signal utilizing means with respect to the rotational sequence of the transmitted signals.

10. In a telemetric system having a plurality of gauge devices, means for transmitting in rapid and repeated rotation signals varying in accordance with the conditions of said gauge devices and a synchronizing signal intermediate the signals for two predetermined gauge devices, the combination of a plurality of recording devices, means operable in like rapid and repeated rotation to direct said synchronizing signal and said varying signals to said recording devices so that each recording device, when acted upon by a varying signal, produces a record of a particular gauge device, an indicating device operable in response to a varying signal for each of a number of said recording devices, means for utilizing said synchronizing signal and said varying signals in like rapid and repeated rotation for actuating all of said indicating devices but the one to which said synchronizing signal is directed to show the phase relationship of said signal utilizing means with respect to the rotational sequence of the transmitted signals.

HARVEY D. GIFFEN.
THOMAS B. THOMSON, Jr.

REFERENCES CITED

The following references are of record in the file of this patent:

UNITED STATES PATENTS

| Number | Name | Date |
|---|---|---|
| 1,361,676 | Brewer | Dec. 7, 1920 |
| 1,388,507 | Bell | Aug. 23, 1921 |
| 1,641,199 | Roucka | Sept. 6, 1927 |
| 1,849,827 | FitzGerald | Mar. 15, 1932 |
| 1,947,255 | Franklin | Feb. 13, 1934 |
| 2,218,914 | Kahn | Oct. 22, 1940 |
| 2,228,883 | Morgan | Jan. 14, 1941 |
| 2,306,391 | Keinath | Dec. 29, 1942 |
| 2,347,160 | Wallace | Apr. 18, 1944 |
| 2,387,496 | Cornelius | Oct. 23, 1945 |
| 2,378,395 | Dickson | June 19, 1945 |

FOREIGN PATENTS

| Number | Country | Date |
|---|---|---|
| 563,934 | Germany | Nov. 11, 1932 |